United States Patent
Curley, Jr. et al.

(10) Patent No.: US 6,758,645 B2
(45) Date of Patent: Jul. 6, 2004

(54) LOCKING CAGE FASTENER

(75) Inventors: William J. Curley, Jr., Waterbury, CT (US); James F. Norkus, Waterbury, CT (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/328,819

(22) Filed: Dec. 24, 2002

(65) Prior Publication Data

US 2003/0147715 A1 Aug. 7, 2003

Related U.S. Application Data

(60) Provisional application No. 60/353,141, filed on Feb. 1, 2002.

(51) Int. Cl.[7] .......................... F16B 37/06; F16B 39/284
(52) U.S. Cl. ........................ 411/111; 411/107; 411/171; 411/432
(58) Field of Search ................. 411/107, 111, 411/112, 113, 171, 174, 175, 432, 999

(56) References Cited

U.S. PATENT DOCUMENTS

| | | | |
|---|---|---|---|
| 1,797,081 A | 3/1931 | Fluker | |
| 2,394,729 A | * 2/1946 | Tinnerman | 411/112 |
| 2,405,925 A | * 8/1946 | Poupitch | 411/113 |
| 2,451,991 A | 10/1948 | Swanstrom | |
| 2,716,434 A | * 8/1955 | Crowther | 411/174 X |
| 2,717,622 A | * 9/1955 | Flora | 411/112 |
| 2,825,380 A | 3/1958 | Reiner | |
| 3,060,988 A | 10/1962 | Munse | |
| 3,219,089 A | 11/1965 | Zahodiakin | |
| 4,015,650 A | 4/1977 | Anderson | |
| 4,193,435 A | 3/1980 | Charles et al. | |
| 4,676,706 A | * 6/1987 | Inaba | 411/175 |
| 5,096,350 A | 3/1992 | Peterson | 411/112 |
| 5,538,377 A | 7/1996 | Stewart et al. | 411/174 |
| 5,624,319 A | 4/1997 | Golczyk et al. | 470/21 |
| 5,947,518 A | 9/1999 | Redman et al. | 280/781 |
| 6,146,071 A | 11/2000 | Norkus et al. | 411/104 |

* cited by examiner

*Primary Examiner*—Neill Wilson
(74) *Attorney, Agent, or Firm*—Mark W. Croll; Paul F. Donovan

(57) ABSTRACT

A cage for a cage fastener includes a base and sides, with a flap integral with one side bendable to be disposed in spaced relation to the base and overlying the base. A distal edge of the flap and a distal edge of one of the sides define a cooperating locking structure whereby the position of the flap relative to the side can be secured, with a fastener positioned between the flap and the base.

18 Claims, 2 Drawing Sheets

LOCKING CAGE FASTENER

CROSS REFERENCED TO RELATED APPLICATION

This Non-Provisional Application claims benefit to U.S. Provisional Application Serial No. 60/353,141 filed Feb. 1, 2002.

FIELD OF THE INVENTION

The present invention relates to fastening systems, and, more particularly, to encaged threaded fasteners such as a cage nut or cage bolt.

BACKGROUND OF THE INVENTION

Caged fasteners, such as caged nuts, are used commonly in the manufacture and assembly of many items such as automobiles and other vehicles. A caged fastener can be assembled into a product framework during manufacture of a subassembly, and thereby provided in position for attachment to another subassembly during final assembly of the vehicle. The fastener can be provided in an enclosed space that otherwise would be un-accessible for positioning a fastener during final assembly.

Threaded nuts are commonly provided as a caged component of a fastening system. A caged nut includes a nut enclosed in various types of structures that hold the nut in relative position, but allow for some adjustment in position for the nut during final assembly. It is advantageous to allow the nut to move in one or several directions since manufacturing tolerances and assembly tolerances frequently require some movement of the fasteners during final assembly. In a common structure for a caged nut, the encaging structure is welded or snapped to the frame, and the nut is permitted to move slightly within the cage that captures the nut.

Since the integrity of the fastened joint relies on the relative security of the two components of the fastener, such as the bolt and the nut to the respective subassemblies to which they are connected, it is necessary that the retainer or encaging structure for the nut be secure. While several different structures are known, the common structural components included a base plate and a flap or flaps extending from the base plate. The flap or flaps are folded over the top of the nut, and define an opening in the top of the cage that can be aligned with the threaded opening in the nut so that a bolt may be extended there through into the nut. It is known to provide the defined opening by the flaps somewhat larger than the threaded opening in the nut, thereby allowing the nut to be moved relative to the encaging structure, with the threaded hole in the nut still being accessible. The base plate of the nut is welded to the frame or other assembly.

The strength of an encaged fastener as thus described is dependent upon the strength of the encaging structure holding the nut. A problem has occurred in that some assemblies do not provided force against the top of the encaging structure, and tightening the nut and bolt can cause deflection of the flaps overlying the nut. Further, during shipment and handling of large subassemblies, the encaging structure can be bent sufficiently to release the nut held therein. If that occurs, final assembly is complicated.

What is needed in the art, is an encaging structure for a cage nut that has overlying flaps that can be locked into position to retain a nut therein securely and permanently.

SUMMARY OF THE INVENTION

The present invention provides an encaged fastener, such as a cage nut, which includes a base and a flap overlying the base defining a space there between for retaining a fastener. The flap is integral with one sidewall of the encaging structure and together with an opposite sidewall of the encaging structure defines a locking mechanisms whereby the encaging structure can be locked in an assembled position.

In one aspect thereof, the present invention provides a cage nut assembly with a nut, including a body having a threaded bore, and a cage. The cage includes a base, and a first side integral with the base and having a distal edge. A second side is integral with the base and disposed substantially opposite relative to the first side on the base. A flap is integral with the second side and substantially spans the base, in spaced relation thereto. The flap has a distal edge adjacent the distal edge of the first side. The nut is disposed in the cage between the base and the flap. The distal edge of the first side and the distal edge of the flap having a cooperating locking structure for securing the flap to the first side.

In another aspect thereof, the present invention provides a cage fastener assembly with a fastener having threads and a cage. The cage includes a base, a first side integral with the base and disposed at substantially right angles thereto. The first side has a distal edge. A second side substantially parallel to the first side is disposed on an opposite side of the base. The second side is integral with the base. A flap integral with the second side spans the base in spaced relation thereto. The flap has a distal edge in proximity with the distal edge of the first side. The fastener is disposed in the cage and has a portion thereof extending through the flap. The distal edge of the first side and the distal edge of the flap define a cooperating locking structure for securing the flap to the first side.

In a further aspect thereof, the present invention provides a cage for a cage fastener. The cage has a base and a first side integral with the base. The first side has a distal edge including a locking member forming a first component of a cooperating locking structure. A second side is integral with the base and is disposed at an edge of the base substantially opposite to the first side. A flap is integral with the second side, and has a distal edge defining a second locking component of the cooperating locking structure. The cage is adapted for bending to bring the first and second components into locking position to secure the cage in a closed position.

An advantage of the present invention is providing a cage fastener that is easy to assemble, and securely retains a fastener of a fastening system.

Another advantage of the present invention is providing a cage nut that allows restricted movement of the nut during fastening of a fastening system.

Still another advantage of the present invention is providing a cage fastener that elevates the fastener from the base of the encaging structure, thereby allowing paint or other coatings to be applied without adhering the fastener in a fixed position.

Other features and advantages of the invention will become apparent to those skilled in the art upon review of the following detailed description, claims and drawings in which like numerals are used to designate like features.

Figure 1:
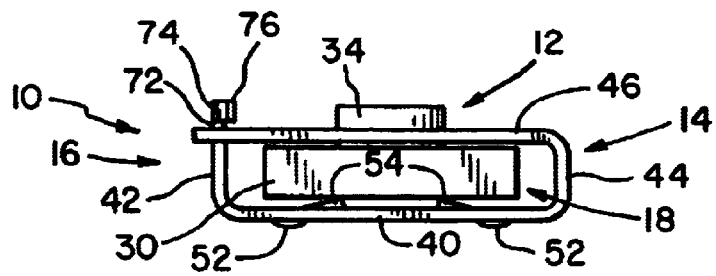
FIG. 1 is a side elevational view of a cage fastener assembly in accordance with the present invention.
Figure 2:
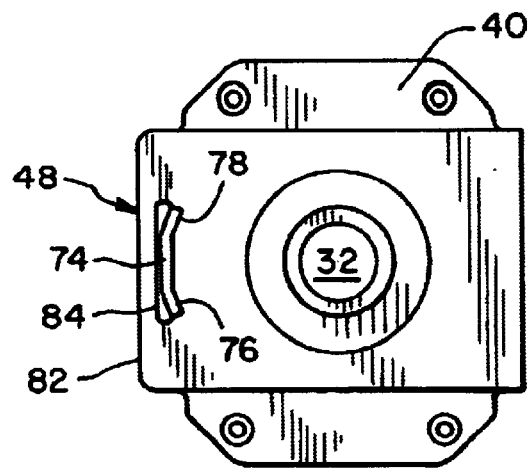
FIG. 2 is a top plan view of the cage nut shown in FIG. 1.
Figure 3:
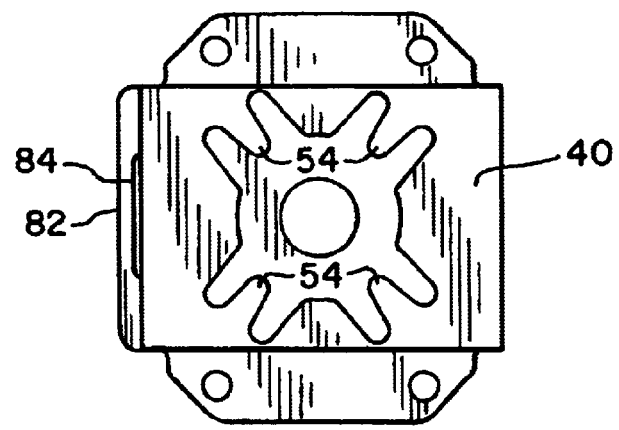
FIG. 3 is a plan view of the bottom the cage nut shown in FIGS. 1 and 2.

Before the embodiments of the invention are explained in detail, it is to be understood that the invention is not limited in its application to the details of construction and the arrangements of the components set forth in the following description, or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising", and variations thereof, is meant to encompass the items listed thereafter and equivalents thereof, as well as additional items and equivalents thereof.

DETAILED DESCRIPTION OF THE PREFERRED EMBODIMENT

Figure 6:
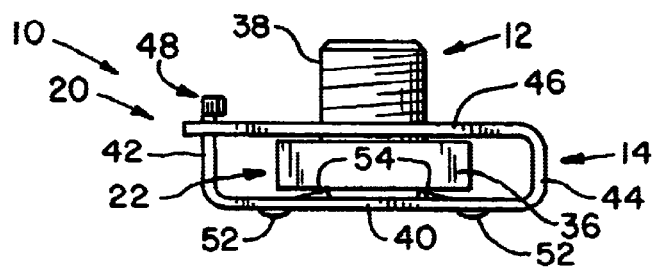
FIG. 6 is a side elevational view of another embodiment of a cage fastener assembly in accordance with the present invention.

Referring now more specifically to the drawings, and to FIG. 1 in particular, a cage fastener assembly 10 in accordance with the present invention is shown, which includes a fastener 12 and a cage 14. Cage fastener assembly 10 illustrated in FIG. 1 is in the nature of a cage nut assembly 16, including cage 14 and fastener 12 in the nature of a nut 18. As illustrated in FIG. 6, cage fastener assembly 10 also can be in the form of a cage bolt assembly 20, including cage 14 and fastener 12 in the nature of a bolt 22. Cage fastener assembly 10 can be of different sizes and general shapes, without departing from the scope of the present invention.

Fastener 12 in the nature of nut 18 (FIG. 1) includes a nut body 30 having a threaded bore portion 32. An extended portion 34 projects outwardly of nut body 30, and is formed integrally therewith. Bore 32 is continued through extended portion 34, and may or may not be threaded in extended portion 34. If unthreaded, bore 32 in extended portion 34 is of sufficient diameter to allow a threaded bolt or other fastener component (not shown) to pass there through for engagement with the threaded portion of bore 32 in nut body 30.

Fastener 12 in the nature of bolt 22 (FIG. 6) includes a bolt head body 36 and an extended threaded shank portion 38. Shank portion 38 projects outwardly of bolt head body 36, and may be threaded through out its length from bolt head body 36, or may be threaded only at an end portion thereof, with an unthreaded portion adjacent bolt head body 36.

Fasteners 12 as either nut 18 or bolt 22 are common fasteners of the type, or can be specialty fastener components, as required by the specific application of cage fastener assembly 10. Metals are suitable materials for fastener 12, although other materials may also be suitable.

Fastener 12, as either nut 18 or as bolt 22, is held in cage 14, in proper position for securement with another bolt or nut, respectively. Cage 14 includes a base 40, a first side wall 42, a second side wall 44 and a flap or top 46. First and second sidewalls 42 and 44 are each formed integrally with base 40, and flap 46 is formed integrally with second sidewall 44. In accordance with the present invention, flap 46 and first side wall 42 form separate locking components of a cooperating locking structure 48 by which cage 14 is secured in a closed position, with fastener 12 retained therein.

Base 40 includes a central opening 50 with one or more weld projections 52 placed around opening 50, by which base 40 can be secured to a surface (not shown) by welding. Other means for attaching base 40 to a surface (not shown) including, but not limited to screws, rivets, snap in features, and adhesives also can be used. Also surrounding opening 50 are a plurality of lift fingers 54. Nut body 30 or bolt head body 36 rest on lift fingers 54, in a slightly elevated position relative to base 40. Liquid coatings, including paint and the like, can be applied to cage 14 and a frame or other structure to which cage 14 is attached, and will flow under fastener 12, without adhering fastener 12 to either base 40 or the surface (not shown) to which cage 14 is attached.

First and second sidewalls 42 and 44, are formed integrally with base 40, on opposite margins of base 40. After bending along fold lines 56 and 58, respectively, sidewalls 42 and 44 are at substantially right angles to base 40. Flap 46 is positioned in spaced relation to base 40, by bending along fold line 60. Second sidewall 44 is a connecting web between base 40 and flap 46, being integral with both. Flap 46 is spaced sufficiently from base 40 by sidewalls 42 and 44 to accommodated the placement of nut body 30 or bolt head body 36 between flap 46 and base 40.

Figure 4:
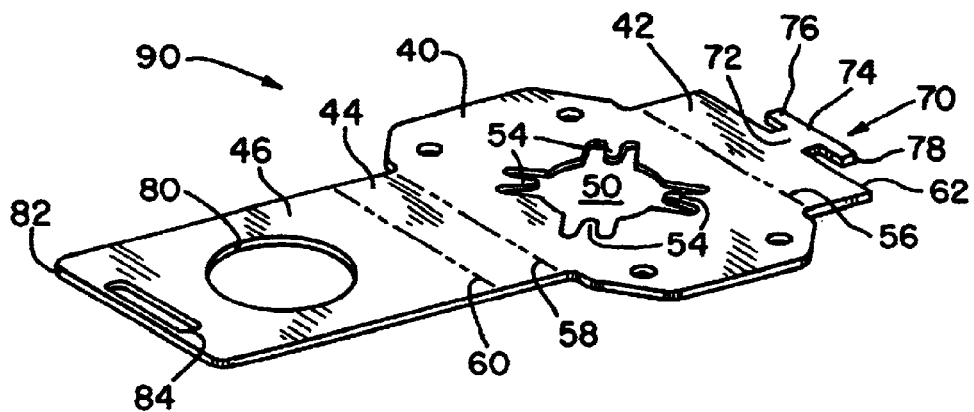
FIG. 4 is a perspective view of the encaging structure prior to assembly of the caged nut.
Figure 5:
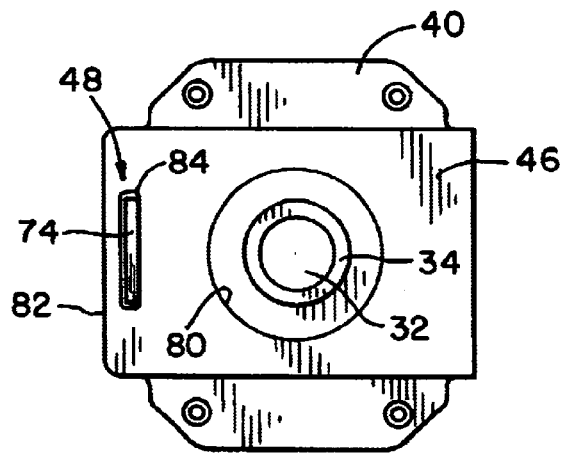
FIG. 5 is a top plan view similar to that of FIG. 2 but illustrating the cage nut assembly before final completion of the assembly.

It should be understood that fold lines 56, 58 and 60 shown in FIG. 4 are provided for the purpose of illustrating the location at which folds or bends are formed, and do not necessarily illustrate structure. The folds or bends can be formed with the use of a proper tool; however, it is also possible for creases or other formations to be used to facilitate the proper location of the bends or folds.

First sidewall 42 has a distal edge 62 along which a first locking member 70 is formed. Locking member 70 is a substantially T-shaped body having a trunk 72 and an arm 74 extending outwardly from distal edge 62. Tabs 76 and 78 are provided on opposite ends of arm 74, outwardly of trunk 72. Tabs 76 and 78 can be bent out of a plane defined by trunk 72.

Flap 46 defines a central aperture 80 that substantially aligns with central opening 50 of base 40 in final assembly and formation of cage fastener assembly 10. As illustrated in FIGS. 1–3 and 5, extended portion 34 of nut 18 extends from nut body 30 outwardly through central aperture 80, slightly beyond flap 46. Extended portion 34 is only loosely retained in aperture 80, so that nut 18 can be moved as necessary to receive a threaded fastener (not shown) during final assembly. In cage bolt assembly 20 illustrated in FIG. 6, shank portion 38 extends from bolt head body 36 outwardly through central aperture 80, beyond flap 46. Shank portion 38 is only loosely retained in aperture 80, so that bolt 22 can be moved as necessary to receive a threaded fastener (not shown) during final assembly.

At an outer margin portion thereof, near a distal edge 82 of flap 46, a slot 84 is defined through flap 46. Slot 84 is of sufficient length and width that locking member 70 can be inserted there through. However, slot 84 is not significantly larger then necessary to receive locking member 70, so that slight bending of tabs 76 and 78 prevents retraction of locking member 70 from and through slot 84. While tabs 76 and 78 are illustrated to be bent in the same direction, i.e. toward central aperture 80, it should be understood that the flaps also can be bent in opposite directions, one toward and one away from central aperture 80, or can be both bent in a direction generally away from central aperture 80.

Advantageously, cage 14 is provided as a one-piece structure formed by stamping or the like from sheet material such as metal (FIG. 4). The stamped blank 90 is bent into the final shape of cage 14, as shown in the drawings.

To assemble cage fastener assembly 10 with nut 18, blank 90 is formed by a stamping or cutting operation from a piece of sheet material, such as steel or other metal. Blank 90 is bent at fold lines 56 and 58 to form substantial right angles between first side wall 42 and base 40, and between second side wall 44 and base 40. At this stage, partially assembled cage 14 can be attached to a frame or other structure by welding in the locations of weld projections 52. Other attachment schemes can be used, and attachment can be delayed until after a fastener 12 is installed in cage 14.

Nut 18 is positioned with extended portion 34 in central aperture 80, as a further bend is made at fold line 60. As distal edge 82 of flap 46 approaches distal edge 62 of first sidewall 42, arm 74 of locking member 70 is positioned to slide through slot 84. As an underside of flap 46 is brought into substantial contact with distal edge 62, arm 74 will have passed completely through slot 84. Thereafter, tabs 76 and 86 are bent to prevent retraction of arm 74 through slot 84. Nut body 30 is restrained between base 40 and flap 46, and rests on lift fingers 54 in an elevated position with respect to base 40. Extended portion 34 projects loosely through central aperture 80, holding nut 18 in cage 14, but allowing some movement and repositioning of nut 18 relative to cage 14 so that nut 18 can be aligned properly with a fastener to be connected therewith.

If a cage bolt assembly 20 is to be formed, the procedure is essentially the same as that described above for cage nut assembly 16. Shank portion 38 of bolt 22 is positioned in central aperture 80 of flap 46, and bolt head body 36 rests on lift fingers 54.

With tabs 76 and 78 of arm 74 bent so as to be in nonalignment with slot 84, cage 14 is securely held in the assembled position. Flap 46 can not be moved inadvertently relative to base 40. Further, as caged fastener 12 is tightened relative to a cooperating fastener (not shown), cage 14 remains closed, and fastener 12 is retained in its proper position.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention, and will enable others skilled in the art to utilize the invention. The claims are to be construed to include alternative embodiments to the extent permitted by the prior art.

Various features of the invention are set forth in the following claims.

What is claimed is:

1. A cage nut assembly comprising;
   a nut including a body having a threaded bore;
   a cage including;
      a base;
      a first side integral with said base and having a distal edge;
      a second side integral with said base and disposed substantially opposite relative to said first side on said base; and
      a flap integral with said second side and substantially spanning said base in spaced relation thereto, said flap having a distal edge adjacent said first side, said flap including a slot near said distal edge of said flap;
   said nut disposed in said cage between said base and said flap; and
   said distal edge of said first side and said distal edge of said flap having a cooperating locking structure for securing said flap to said first side, said digital edge of said first side including a locking member adapted to extend through said slot.

2. The cage nut assembly of claim 1, said first side locking member including tabs adapted for bending to secure said first side and said flap.

3. The cage nut assembly of claim 2, said flap including an aperture defined therethrough, and said nut including an extended portion projecting into said aperture.

4. The cage nut assembly of claim 1, said flap including an aperture defined therethrough, and said nut including an extended portion projecting into said aperture.

5. The cage nut assembly of claim 1, said base including lift fingers, and said nut including a nut body resting on said lift fingers.

6. A cage fastener comprising;
   a fastener having threads;
   a cage including;
      a base;
      a first side integral with said base and disposed at substantially right angles thereto, said first side having a distal edge;
      a second side substantially parallel to said first side and disposed on an opposite side of said base, said second side being integral with said base; and
      a flap integral with said second side and spanning said base in spaced relation thereto, said flap having a distal edge in proximity with said distal edge of said first side;
   said fastener disposed in said cage and having a portion thereof extending through said flap; and
   said distal edge of said first side and said distal edge of said flap defining a cooperating locking structure for securing said flap to said first side.

7. The cage fastener of claim 6, said flap including a slot near said distal edge of said flap, and said distal edge of said first side including a locking member adapted to extend through said slot.

8. The cage fastener of claim 7, said first side locking member including tabs adapted for bending to secure said first side and said top.

9. The cage fastener of claim 6, said fastener being a nut.

10. The cage fastener of claim 6, said fastener being a bolt.

11. The cage fastener of claim 6, said base including lift fingers supporting said fastener.

12. The cage fastener of claim 6, said base including at least one weld projection.

13. A cage for a cage fastener assembly, said cage comprising;
   a base;
   a first side integral with said base and having a distal edge, said distal edge including a locking member forming a first locking component of a cooperating locking structure;
   a second side integral with said base and disposed at an edge of said base substantially opposite to said first side;

a flap integral with said second side, said flap having a distal edge defining a second locking component of said cooperating locking structure, said locking component of said flap including a slot defined near said distal edge of said flap; and said cage being adapted for bending to bring said first and second components into locking position to secure said cage in a closed position.

14. The cage of claim 13, said locking component of said distal edge of said first side including an arm extending through said slot.

15. The cage of claim 14, said arm including tabs bendable to secure said arm relative to said slot.

16. The cage of claim 13, said base including lift fingers.

17. The cage of claim 13, said base including at least one weld projection.

18. The cage of claim 13, said base defining a central opening therein, and said flap defining a central aperture therein.

* * * * *